US012384066B2

(12) United States Patent
Penazzi et al.

(10) Patent No.: US 12,384,066 B2
(45) Date of Patent: Aug. 12, 2025

(54) APPARATUS AND METHOD FOR CUTTING CLOSURES FOR CONTAINERS

(71) Applicant: SACMI COOPERATIVA MECCANICI IMOLA SOCIETA' COOPERATIVA, Imola (IT)

(72) Inventors: Davide Penazzi, Imola (IT); Matteo Venturini, Imola (IT); Ruggero Menzolini, Imola (IT)

(73) Assignee: Sacmi Cooperativa Meccanici Imola Societa' Cooperativa, Imola (IT)

( * ) Notice: Subject to any disclaimer, the term of this patent is extended or adjusted under 35 U.S.C. 154(b) by 0 days.

(21) Appl. No.: 17/856,300

(22) Filed: Jul. 1, 2022

(65) Prior Publication Data

US 2023/0028211 A1 Jan. 26, 2023

(30) Foreign Application Priority Data

Jul. 21, 2021 (IT) ........................ 102021000019310
Apr. 29, 2022 (IT) ........................ 102022000008678

(51) Int. Cl.
*B26D 3/16* (2006.01)
*B26D 1/00* (2006.01)
*B26D 7/06* (2006.01)
*B26F 1/18* (2006.01)

(52) U.S. Cl.
CPC ........... *B26D 3/164* (2013.01); *B26D 1/0006* (2013.01); *B26D 7/0616* (2013.01); *B26F 1/18* (2013.01); *B26D 2001/0046* (2013.01); *B26F 2210/04* (2013.01)

(58) Field of Classification Search
CPC .................. B26F 2210/18; B26F 1/18; B26D 2001/0046; B26D 7/0616; B26D 1/0006; B26D 3/164
See application file for complete search history.

(56) References Cited

U.S. PATENT DOCUMENTS

| | | | | |
|---|---|---|---|---|
| 6,826,994 | B1 * | 12/2004 | Liao | B29C 59/007 425/291 |
| 2020/0384717 | A1 * | 12/2020 | Tanaka | B32B 27/306 |
| 2022/0379515 | A1 * | 12/2022 | Friedli | B26F 1/18 |

FOREIGN PATENT DOCUMENTS

| | | | |
|---|---|---|---|
| WO | 2020247319 | A1 | 12/2020 |
| WO | 2021014290 | A1 | 1/2021 |
| WO | 2021063776 | A1 | 4/2021 |

* cited by examiner

*Primary Examiner* — Liang Dong
(74) *Attorney, Agent, or Firm* — LAUBSCHER & FRETWELL, P.C.

(57) ABSTRACT

A cutting method and apparatus for closures of the "tethered" type are disclosed, in which a spindle that carries a closure is moved to a cutting device with one or more horizontal blades and at least one vertical or oblique blade. During cutting, the spindle rotates and the closure rolls on the cutting device. The spindle, which is fed several times to the cutting device carrying each time a different closure, comprises a portion made of a softer material than the blades so that during cutting the blades penetrate the material of the closure and then sink into the softer portion of the spindle. Feeding the spindle that carries the closure to the cutting device is coordinated with rotation of the spindle so that the vertical or oblique blade, each time that the spindle is fed to the cutting device, always meets the same zone of the softer portion of the spindle.

7 Claims, 5 Drawing Sheets

APPARATUS AND METHOD FOR CUTTING CLOSURES FOR CONTAINERS

CROSS-REFERENCE TO RELATED APPLICATIONS

This application claims priority from Italian Patent Application Nos. 102022000008678 filed Apr. 29, 2022 and 102021000019310 filed Jul. 21, 2021. The entire content of these applications is incorporated herein by reference.

BACKGROUND OF THE INVENTION

The invention relates to an apparatus and a method for cutting closures or capsules that are usable for closing containers, such as for example bottles, in particular, closures or capsules made of plastics.

Specifically, but not exclusively, the invention relates to a cutting apparatus and method that are suitable for making the facilitated opening device with which a closure or capsule of the type called "tethered" is provided, i.e. a closure or capsule that remains connected to the container after opening.

The prior art comprises methods for making the facilitated opening device of a "tethered" capsule forming on the capsule one or more horizontal cuts and at least one vertical or oblique cut, where "horizontal", "vertical" and "oblique" refer to the capsule arranged with the geometric axis vertical. In general, known methods provide for the capsule to be moved along a cutting path with fixed blades, by a rotating spindle that supports the capsule and acts as an abutting element to enable the fixed blades to cut effectively.

Patent publication WO 2020/247319 A1 shows a method for making through cuts in a capsule, with a spindle that carries the capsule to fixed blades configured to form on the capsule one or more horizontal cuts and at least one vertical cut, in which the blades penetrate the material of the capsule and then sink into an annular part of the spindle made of a soft material that enables the blades not to be damaged and to last longer.

Patent publication WO 2021/063776 A1 shows a method for making through cuts in a capsule, with a spindle that takes the capsule to fixed blades configured to form on the capsule one or more horizontal cuts and at least one vertical cut, in which the blades penetrate the material of the capsule and then enter grooves arranged on the spindle with a geometry corresponding to the geometry of the cuts to be formed and in which a synchronization device coordinates advancement of the capsule to the fixed blades with the rotation of the spindle that carries the capsule, so that the cuts, above all the vertical cut, are made in such a manner that the geometry of the blades corresponds to the geometry of the grooves.

SUMMARY OF THE INVENTION

One object of the invention is to provide an apparatus and/or a method for cutting closures for containers that are alternative to known ones.

One object is to make available an apparatus and/or a cutting method suitable for forming closures of the type known as "tethered".

In one embodiment of the invention, a cutting method comprises the steps of moving a spindle that takes a closure to a cutting device with one or more horizontal blades and at least one vertical or oblique blade, in which during cutting the spindle rotates and the closure moves on the cutting device, in which the spindle is fed several times, cyclically, to the cutting device carrying each time a different closure, in which the spindle comprises a portion made of a softer material than the blades so that during cutting the blades penetrate with a through cut the material of the closure and then sink into the softer portion of the spindle, and in which feeding the spindle that carries the closure to the cutting device is coordinated with rotation of the spindle so that the vertical or oblique blade, each time that the spindle is fed to the cutting device, always meets the same linear, vertical or oblique linear zone of the softer portion of the spindle.

In some specific solutions for implementing the invention, the cutting apparatus may comprise a rotatable carousel that supports a plurality of spindles and supplies the feed motion to each spindle to the cutting device. In these cases, the aforesaid coordination—between the feed motion of the spindle that takes the closure to the cutting device and the rotation motion of the spindle that promotes rolling of the closure on the cutting device—may be achieved in different ways.

In one embodiment, it is possible to arrange a first drive motor for the rotation of the carousel around a carousel axis, and a second drive motor (distinct from the first drive motor) for the rotation of each spindle around its spindle axis.

In one specific embodiment, the second motor may comprise a single motor (for example a brushless motor) connected to the various spindle axes by a mechanical transmission (for example with a flexible member). In this specific embodiment, the aforesaid coordination between the feed motion and the rotation motion of each spindle may be made, in particular, by an electronic controller that may be connected to a sensor configured to detect the positioning (angular around the respective axes) of the carousel and of each of the various spindles. This sensor may comprise, for example, an encoder arranged on the first motor and an encoder arranged on the second motor.

In another specific embodiment, the second motor may comprise a plurality of motors, one for each spindle, each motor being connected to a respective spindle axis. Also in this other specific embodiment, the coordination between the feed motion and the rotation motion of the spindles may be performed by an electronic controller with a sensor comprising, for example, an encoder with which both the first motor of the carousel and the respective drive motors of the single spindles may be provided.

In another embodiment, it is possible to arrange a drive motor for rotating the carousel around the carousel axis, with a mechanical transmission system that connects the axis of the carousel to the axes of the various spindles. In this other embodiment, the coordination between the feed motion of the spindles (i.e. the rotation of the carousel) and the rotation motion of the single spindles is entrusted substantially to suitable design of the aforesaid system of mechanical transmission.

When the spindle is carried by a rotating carousel, the latter will define the arc circumference path of the closure or capsule at the cutting device. In this case, it is important to set the condition to pass the spindle in front of the cutting device again in the same angular position as each revolution of the carousel. This condition may be achieved by ensuring that there is a preset ratio between the speed of the rotation axis of the carousel and the speed of the rotation axis of the spindle (for example 1:N, in which N=integer number, between the number of revolutions in the unit of time of the axis of the carousel and of the axis of the spindle).

The use of a portion of spindle made in a relatively soft material, in combination with the decision to make the vertical or oblique blade act in the same (linear) zone of the softer portion of the spindle at each passage of the spindle, enables some limits and drawbacks of the prior art to be solved.

In the first place, significant reduction in wear to the softer portion of the spindle is obtained (for example with respect to the solution described by WO 2020/247319 A1) because of the fact that the vertical or oblique blade will penetrate the softer portion of the spindle always in the same position, so that in the first passages of the spindle the vertical or oblique blade will gouge a sort of vertical or oblique slit or groove in the material of the softer portion of the spindle and then, in the subsequent passages, will always interact with the previously gouged slit or groove, i.e. in the same (linear) zone, without damaging the spindle further.

In practice, as the vertical or oblique blade is always located in the same vertical or oblique zone of the softer portion of the spindle at each passage of the spindle, this softer portion of the spindle becomes worn in the initial step, during the first passages of the spindle, on the aforesaid vertical or oblique zone, after which, it no longer becomes worn. Further, the aforesaid vertical or oblique blade of the cutting device will produce very localized wear, only on the aforesaid vertical or oblique zone of the softer portion of the spindle, without affecting other zones of the spindle, which can thus remain whole and not worn for a long time, performing an excellent function in relation to closure during the cutting operation.

Secondly, the cutting method is significantly facilitated because the abutting function exerted by the spindle will be particularly effective, precisely because the vertical or oblique blade of the cutting device interferes only with an extremely limited zone of the spindle, i.e. in the vertical or oblique linear zone in the soft portion of the spindle in which the vertical or oblique blade sinks, leaving intact and whole the remaining part of the soft portion of the spindle, above all the zones situated in the immediate vicinity of the vertical or oblique linear zone that is worn and where cutting occurs. Thus such zones, as they are not worn and are contiguous with the actual cutting zone, can act as an abutting element for cutting with as much functionality as possible.

Think for example of the different situation that arises with the method described by WO 2021/063776 A1, in which the geometry of the grooves arranged on the spindle has, of necessity, to be designed more generously than the geometry of the blades, because it has to take account not only of the manufacturing tolerances of the various components but also of the inevitable fitting uncertainties and of the elasticity of the system (clearances), to avoid the risk of collisions that could seriously damage the blades, so the abutting surface of the spindle that is in contact with the closure during cutting will, of necessity, be at a certain distance from the blade, with a resulting decrease in the efficacy of the abutting capacity.

The solution of the present invention on the other hand solves the aforesaid drawback because the geometry of the zone of the soft portion of the spindle that is worn by the vertical or oblique blade is determined by the blade, owing to the cyclical passage thereof and the sinking thereof in the soft material still in the same zone at each passage, so that the shape of the worn zone corresponds exactly or almost exactly to the shape of the blade, i.e. a vertical or oblique linear shape, of minimum size, optimized by the system, in practice the same as the size of the cutting edge of the blades that sinks into the material of the soft portion of the spindle, apart from possible elasticity and clearances of the system. In each case this size, being generated by the interaction between the blade and the soft portion of the spindle, will be of the necessary minimum size, below which it is not in practice possible to descend because of the unavoidable features of the system.

If, for example, the solution is considered in which the spindles are connected by mechanical transmission (in particular a belt), the inevitable elasticity of the system will produce not always exactly identical positioning of the vertical or oblique cuts but the consequence will be to generate notch zones the dimension of which will have the least possible extent because it is generated by the system.

As a result, the unworn part, i.e. the part that remains intact and whole, of the soft portion of the spindle, is arranged immediately contiguous with the blade, giving rise to minimum play or empty space, thus obtaining maximum efficiency of an abutting action during cutting.

Another advantage of the invention, which is detectable in particular in the embodiment in which feeding the spindle and the rotation of the spindle are connected by a transmission and driven by common motor, consists in that it is no longer necessary to start initial phasing of the cutting apparatus (as, for example, in the solution described by WO 2021/063776 A1) to enable, at the first passage of the spindle in front of the cutting device, the rotating spindle to be in a precise angular position when it passes in front of the vertical or oblique blade.

In fact, in the method described by WO 2021/063776 A1 a very precise and laborious initial phasing procedure is required to put into phase the feeding device of the capsule so that, from the first passage of the spindle, the geometry of the grooves on the spindle is superimposed exactly on the geometry of the blades. It is noted that this initial phasing procedure has to be repeated in practice, at each form change, i.e. at each change of the geometry of the cuts.

Owing to the solution of the present invention, in particular in the embodiment in which feeding the spindle and the rotation of the spindle are connected by a transmission (for example mechanical) and driven by shared motor, this initial phasing procedure can be omitted, also in the case of a format change, considerably simplifying the operations of preparing the cutting apparatus, as what exactly is the zone of the softer portion of the spindle is no longer important that is affected and thus worn by the vertical or oblique blade. In other words, the first passage of the spindle in front of the cutting device can occur effectively whatever the angular position of the spindle at the vertical or oblique blade, independently of the format of the blades.

What counts, in fact, is that in the passages of the spindle after the first passage, the spindle passes in front of the cutting device in the same angular position, but this is a condition that depends on the general operating precision of the cutting apparatus, not on the initial preparation operations.

BRIEF DESCRIPTION OF THE DRAWINGS

The invention can be better understood and implemented with reference to the attached drawings that illustrate non-limiting embodiments thereof, wherein.

DETAILED DESCRIPTION

Figure 1:
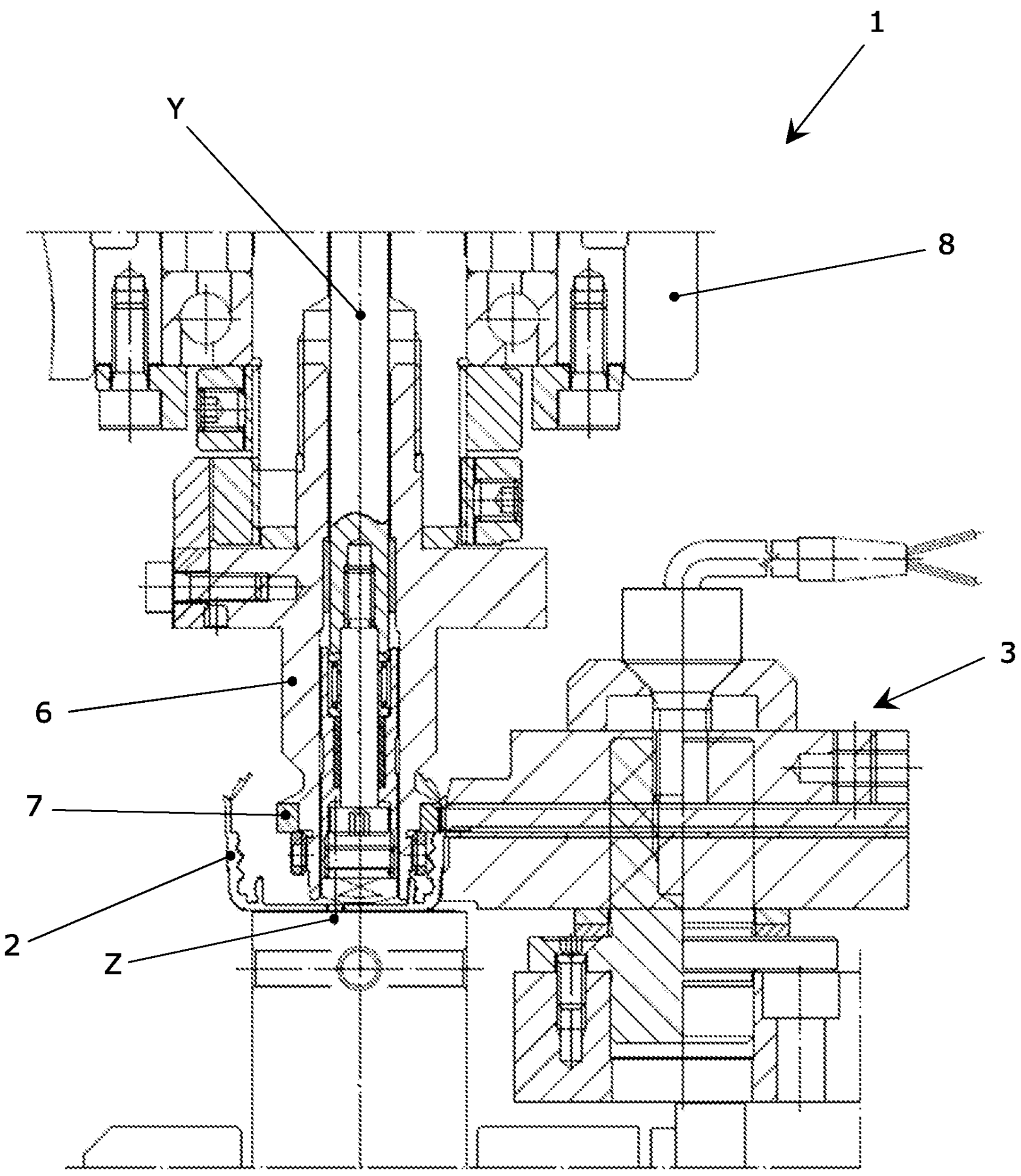
FIG. 1 is a section, in a vertical elevation, of a part of one embodiment of a cutting apparatus made according to the present invention.

With reference to the aforementioned figures, with 1 a cutting apparatus has been generally indicated to cut closures or capsules that are usable for closing containers, such as for example bottles, in particular closures or capsules made of plastics. The cutting apparatus 1 may be suitable, in particular, to make a facilitated opening device with which a closure or capsule of the type called “tethered” is provided, i.e. a closure or capsule that remains connected to the container after opening.

The cutting apparatus 1 may comprise, in particular, cutting device configured to make a facilitated opening device for a closure 2 of the tethered type. The cutting device may comprise, in particular, a cutting device 3 with one or more horizontal blades 4 and with at least one vertical or oblique blade 5. In the specific embodiment, visible in FIGS. 1 and 2, the cutting device 3 comprises two horizontal blades 4 and one vertical blade 5.

The cutting device may comprise, in particular, a cutting device with a different number of horizontal blades, for example three or four or more, and with a different number of vertical or oblique blades, for example two or three or more.

The cutting device 3 may be, in particular, configured to adopt selectively a work position, i.e. a position that is suitable for performing desired through cuts on a closure fed to the cutting device 3, and a rest or retracted position, in which the cutting device 3 is retracted with respect to the work position so as not to interfere with a closure fed to the cutting device 3 and/or with the feeding device for feeding the closure.

The movements (for example linear movements, in particular sliding on linear guides) of the cutting device 3 between the work position and the retracted rest position may be driven manually and/or by motor.

The cutting apparatus 1 may comprise, in particular, feeding device configured to feed a closure 2 to the cutting device. The feeding device may comprise, in particular, at least one spindle 6 with a soft portion 7 made of a softer material than the blades.

The feeding device may be, in particular, so configured that the spindle 6 passes several times in front of the cutting device, carrying each time a different closure 2. The feeding device may comprise, in particular, a feeding carousel 8 that carries the aforesaid spindle 6. The carousel 8 may be, in particular, rotatable (upon a motorized command, for example a brushless motor) around a carousel axis X. The carousel 8 may comprise, in particular, two or more spindles 6, each of which may comprise a respective soft portion 7.

Figure 3:
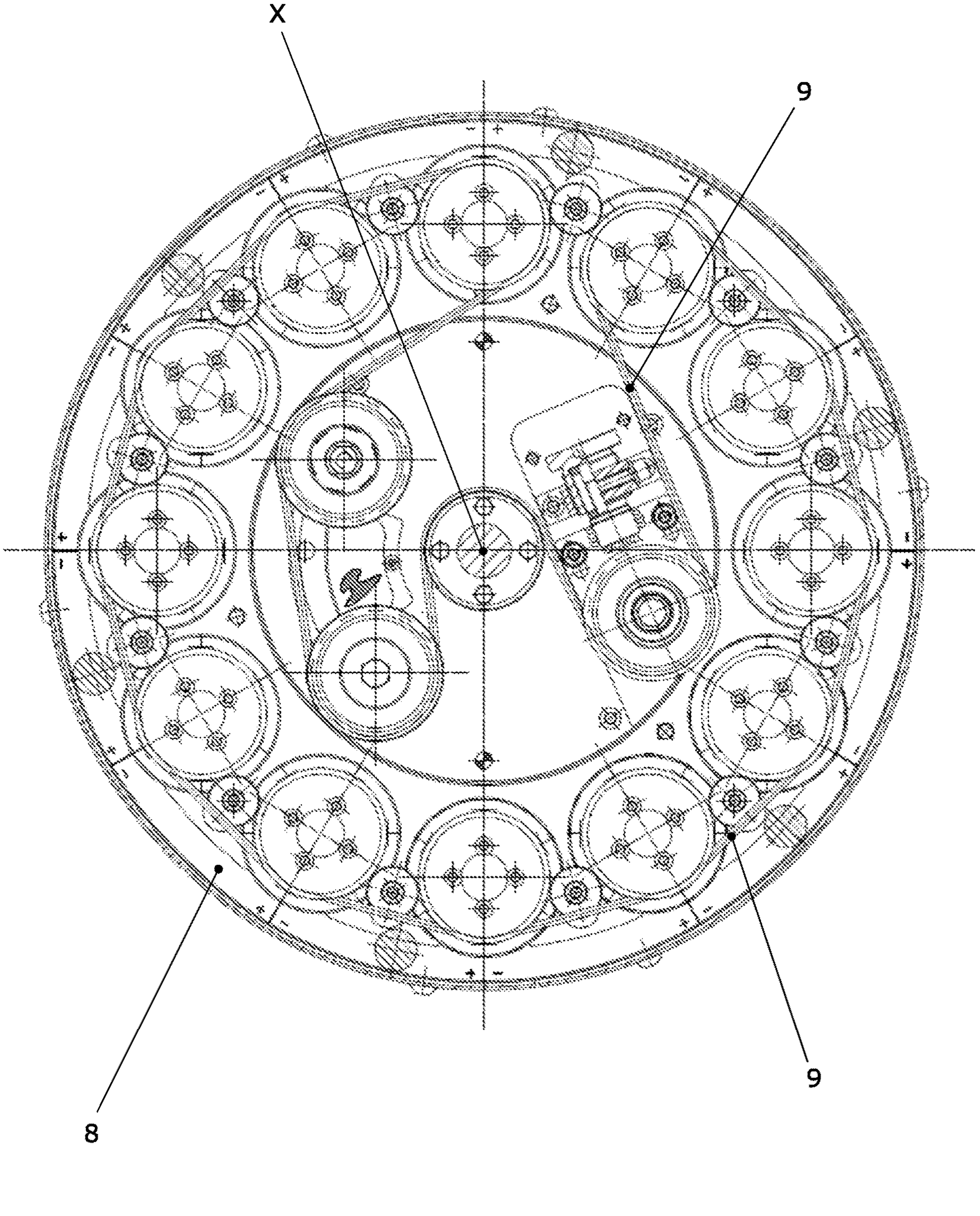
FIG. 3 is a top plan view of the apparatus in FIG. 1.
Figure 4:
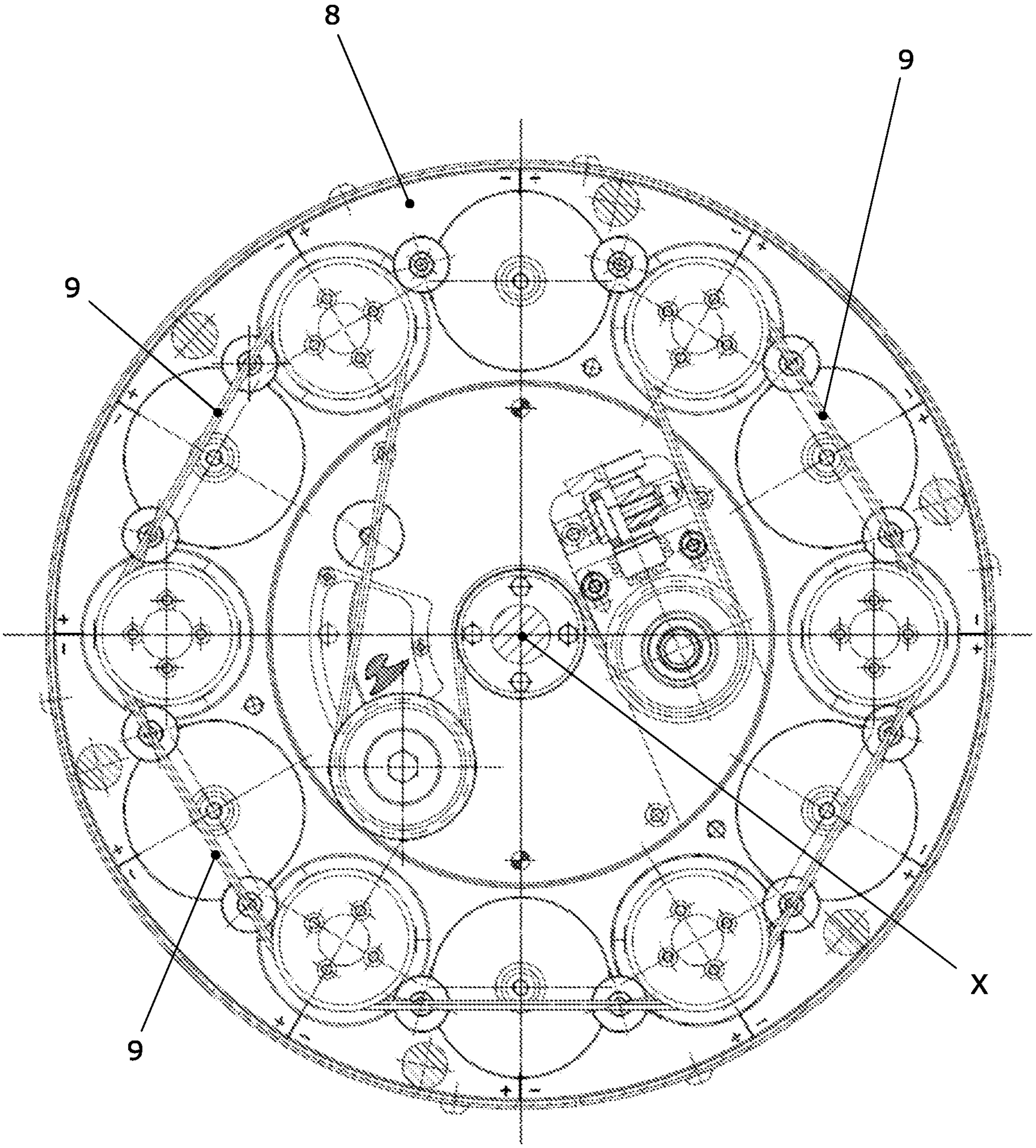
FIG. 4 is a top plan view of another embodiment of a cutting apparatus made according to the present invention.

The carousel 8 may comprise, in particular, three or more spindles 6 arranged angularly spaced apart on a periphery of the carousel. In the specific embodiment of FIG. 3, the carousel comprises twelve equidistant spindles 6. In the specific embodiment of FIG. 4, the carousel comprises six equidistant spindles 6.

Each spindle 6 may be, in particular, rotatable around a respective spindle axis Y and the closure 2 may move (for example, with an at least partially rolling part) on the cutting device such that the blades 4 and 5 penetrate with a through cut the closure 2 and then sink into the soft portion 7 of the spindle. The soft portion 7 acts as an appropriate and effective embodiment for the side wall of the closure 2 during the cutting operation.

Each spindle 6 may be, in particular, rotatable around the spindle axis Y at the command of a distinct motor drive (and controllable independently, for example another brushless motor) with respect to the motor drive that drives the rotation of the carousel 8, or upon the command of the motor drive that drives the rotation of the carousel 8.

The spindle axis Y may be, in particular, parallel to a geometric axis Z of the closure 2. The spindle axis Y may be, in particular, as in this specific embodiment, spaced apart from the geometric axis Z of the closure.

The cutting apparatus 1 may comprise, in particular, a controller to coordinate the rotation of the spindle 6 (around the spindle axis Y thereof) with feeding the spindle 6 (i.e. the advancement motion to the cutting device, which in these embodiments comprises the rotation motion of the carousel 8 that carries the spindles 6) such that the vertical blade 5 (and/or the possible oblique blade), each time that the spindle 6 passes in front of the cutting device, always meets the same vertical or oblique (linear) zone of the soft portion 7.

It is possible to provide, in particular, for the aforesaid coordination of the movements (rotation motion of the spindle and advancement motion of the spindle) to be achieved by ensuring that the ratio between the number of revolutions in the unit of time of the rotation axis of the carousel (X axis) and of the rotation axis of each spindle (Y axis) is the same as 1:N, where N is the same as an integer number (for example a number comprised between 8 and 18, in particular a ratio 1:12, or 1:13, or 1:14).

The cutting apparatus 1 may comprise, in particular, a mechanical transmission that connects the axis of the carousel (X axis) to the axis of each of the aforesaid spindles (Y axis). This mechanical transmission may be constructed so as to achieve the aforesaid coordination of the movements, in particular so as to achieve the aforesaid transmission ratio equal to 1:N, with N equal to an integer number.

This mechanical transmission may comprise, in particular, a transmission comprising at least one flexible transmission member 9 (coupled with pulleys connected to the spindles 6). It is possible to provide however other types of mechanical transmission, for example of gear type.

Further, it is possible to provide for the cutting apparatus comprising electronic controller for the control of the coordinated motion of the axis of the carousel and of the axis of each of the aforesaid spindles synchronously, like for example with one or more electronic cams to coordinate the drive motor of the axis of the carousel with the drive motor of the axis of the spindles. In particular, it is possible to provide for the drive motor of the axis of the spindles comprising a plurality of motors, in particular a motor for each spindle axis, or a single motor connected to a plurality of spindle axes (for example, to all the spindle axes arranged on the carousel) by a mechanical transmission, for example a transmission as disclosed previously.

Each spindle 6 may comprise, in particular, a support body 10 with an annular seat open on one side. The soft portion 7 of the spindle may comprise, in particular, an annular insert that is insertable (in particular, axially) into the aforesaid annular seat through the aforesaid open side (where axially is with reference to the axis of the spindle).

Each spindle 6 may comprise, in particular, an annular locking element 11 that is fixable in a removable manner (for example by screw fixing members) to the support body 10 to close the aforesaid side of the annular seat, so as to keep the annular insert locked in position.

The operation of the cutting apparatus 1 implements a cutting method that may comprise, in particular, the step of feeding a spindle 6 that carries a closure 2 to a cutting device 3, in which the cutting device 3 may comprise, as has been seen, one or more horizontal blades 4 and at least one vertical (or oblique) blade 5.

The spindle 6 (for example rotated by a carousel 8 along a circular advancement path) may be fed several times to the cutting device 3 carrying each time a different closure 2 (for example in a known manner, using a carousel 8 comprising an inlet zone of the closures to be cut and an outlet zone of the cut closures).

Each spindle 6, as said, may comprise a soft portion 7 (of annular shape and coaxial with the spindle axis Y) made of a softer material than the blades. The soft portion 7 may be made of various materials like, for example, PEEK, Delrin®, polyethylene, polypropylene, polyurethane, made of aluminium, copper, tin, bronze, etc.

Figure 2:
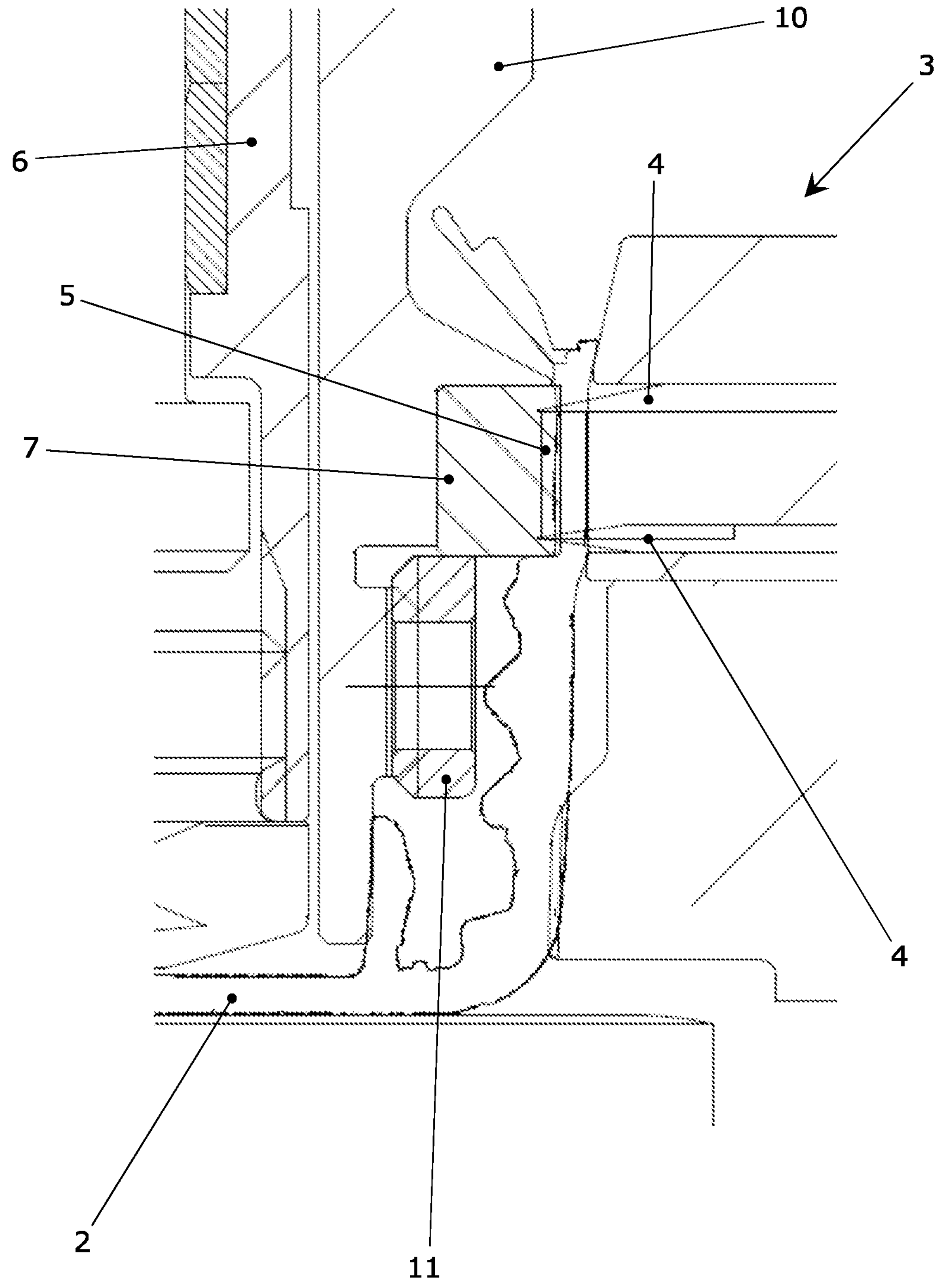
FIG. 2 is an enlargement of a detail of FIG. 1.

The cutting method may comprise, in particular, the step of rotating the spindle 6 around the spindle axis Y thereof and of moving the closure 2 on the cutting device 3 such that the blades 4 and 5 penetrate the closure and sink into the soft portion 7 of the spindle (see FIGS. 1 and 2).

The rotation motion of the spindle 6 may be, in particular, coordinated with the feed motion of the spindle 6 such that the vertical or oblique blade, each time that the spindle is fed to the cutting device, always meets the same vertical or oblique (linear) zone of the soft portion 7 of the spindle.

For this purpose, it is possible, for example, for the spindle to be rotated by a rotatable carousel 8 around a carousel axis X, and the ratio between the number of revolutions in the unit of time of the carousel axis X and the spindle axis Y to be the same as 1:N, with N equal to an integer number.

By so doing, the vertical (or oblique) blade 5 will penetrate the soft portion 7 of the spindle 6 always in the same position or zone (in particular, a linear zone the geometry of which corresponds substantially to the geometry of the vertical or oblique blade 5), reducing significantly wear to the soft portion 7, as in the first passages of the spindle the vertical (or oblique) blade 5 will gouge, in that position or zone on which the blade is located each time, one sort of (linear, vertical or oblique) slit or groove in the material of the softer portion of the spindle.

In the passages following the first passage, the vertical (or oblique) blade 5 will always interact with that position or zone where the previously gouged (linear, vertical or oblique) slit or groove is formed, without further damaging, in other zones, the soft portion of the spindle. Accordingly, the soft portion 7 of the spindle may get worn in the initial step of the operation of the apparatus, during the first passages of the spindle, in the aforesaid vertical or oblique zone, i.e. with wear circumscribed to a relatively limited zone of the overall circumference of the soft portion 7, after which it no longer becomes worn in other vertical or oblique zones.

It is observed that the shape of the worn zone of the soft portion may correspond substantially to the shape of the vertical or oblique blade—apart from minimal dimensional differences due to possible elasticity and clearance of the system—leaving intact and whole the remaining part of the material of the soft portion, which can thus perform the abutting function with maximum efficacy, for appropriate performance of the cutting operation, so that the facilitated opening device of the "tethered" closure will be of extremely precise construction and of high quality. The possible difference between the dimensions of the worn zone of the soft portion and the dimensions of the vertical or oblique blade will be, as said, the minimum possible difference, as the shape and dimensions of the worn zone are generated by the interaction between the blade and the soft portion of the spindle.

The softer portion of the spindle will also get worn in horizontal (circumferential) zones because of the horizontal blades 4 of the cutting device. The horizontal blades 4 will always affect and interact with the same horizontal wear zones of the soft portion at each passage of the spindle (i.e. at each rotation of a revolution of the spindle-holding carousel).

It is noted that, in the embodiment with a single motor drive with mechanical transmission to drive both the feed motion and the rotation motion of the spindles, there is no need to perform any initial phasing of preparation of the cutting apparatus to put the axis of the carousel in phase with the axis of the spindles before starting the apparatus to cut the closures. In fact, it is not necessary for the rotating spindle 6 to be in a very precise angular position when it passes in front of the cutting device 3 (in particular, in front of the vertical or oblique blade 5) at the first passage, i.e. at the initial start of the cutting apparatus 1, as exactly what zone of the softer portion of the spindle is affected and thus worn by the vertical or oblique blade is not important because it is sufficient for the spindle, from the second passage, to pass in front of the cutting device at the same initial angular position of the first passage, whatever this initial angular position was.

In the case of the embodiments with distinct motor drives (one for driving the feed motion of the spindles, i.e. the rotation of the carousel, the other for driving the rotation motion of each spindle around the axis thereof), it is possible to perform initial phasing, whenever the cutting apparatus 1 is switched on and started again, very simply, for example by retracting the cutting device 3 (to avoid damage to the blades) and starting motor-drive to a sort of "empty" initial calibration to enable the sensor (comprising, for example, an encoder) to recognize the angular position of the various spindles with respect to the carousel and then perform adjustments that are appropriate to re-establishing synchronization.

After this short initial phasing step, the cutting device 3 can be again advanced to work position to start up the normal operation of the cutting apparatus. Retracting the cutting device 3 is not strictly indispensable but is useful for avoiding any wear or damage to the material of the soft portion 7.

It is noted that however, also in the event of lack of or imprecise phasing, the only result would be contact of the blade with a zone of the soft spindle portion that was not previously notched, so without any damage to the blade (and with additional wear to the soft portion), contrary to what occurs, for example, in the solution of WO 2021/063776 A1, in which there would be a contact of the blade with a hard zone of the spindle, damaging the blade irreparably.

The cutting apparatus 1 may comprise, in particular (with reference to FIGS. 5 to 8), anti-rotation device 12 configured to prevent rotation of the soft portion 7 of the spindle with respect to the rest of the spindle, in particular to prevent rotation around the spindle axis Y. This specific embodiment solution, in which the anti-rotation device 12 is provided, may be applied, in particular, to any embodiment disclosed previously.

The anti-rotation device 12 operates to ensure the good operation of the aforesaid coordination of the movements (rotation motion of the spindle and advancement motion of the spindle) so that the vertical or oblique blade 5, each time that the spindle 6 is fed to the cutting device 3, always meets the same vertical or oblique zone of the soft portion 7. In fact, this coordination would be imprecise in the event of a rotation (of unpredictable amount) of the soft portion 7 of the spindle with respect to the rest of the spindle.

The anti-rotation device 12 may comprise, as in the embodiments illustrated here, shape coupling between the soft portion 7 and the rest of the spindle 6. In particular, it is possible to provide shape coupling between a central opening of the soft portion 7 (of annular shape) and at least one central portion of the spindle 6 that is inserted into the central opening. The aforesaid central portion may comprise, in particular, at least one portion that is coaxial with the spindle axis Y.

Figure 5:
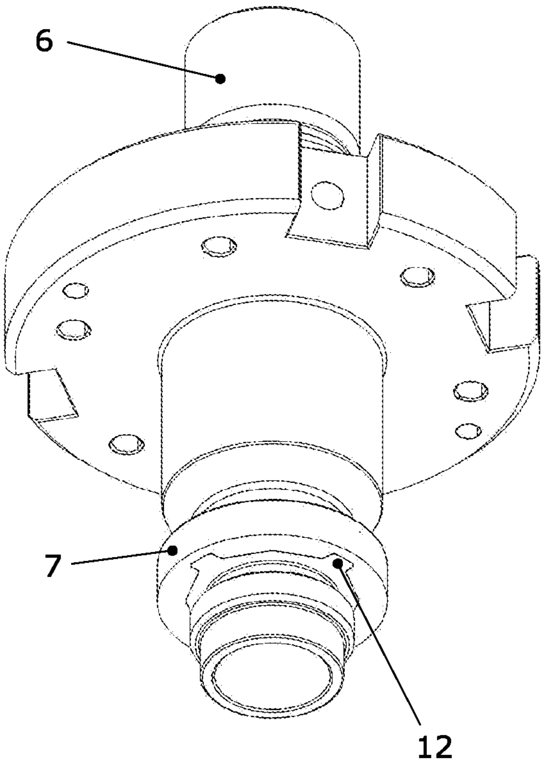
FIGS. 5 to 8 show four embodiments of anti-rotation devices arranged on the spindle to prevent the rotation of the soft portion of the spindle.

The anti-rotation device 12 may comprise, as in the embodiment of FIG. 5, at least one tooth protruding radially outside (with reference to the spindle axis Y) from a central portion of the spindle 6 and inserted with shape coupling inside a corresponding cavity obtained on the inner surface of the soft portion 7 that bounds the central opening.

In the specific embodiment of FIG. 5, the anti-rotation device 12 comprises a plurality of teeth protruding radially (in particular, four teeth, even if it is possible to use two, three, five or more teeth) and arranged at an angular distance (for example equal) from one another, in which each tooth is coupled with a respective cavity. In practice, in this embodiment the anti-rotation device 12 comprises a grooved coupling between a portion of the spindle 6 and the soft portion 7.

Figure 6:
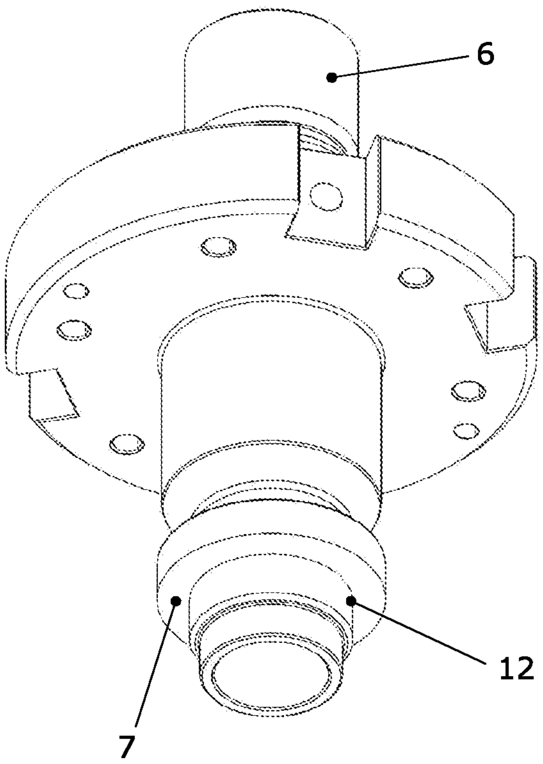

The anti-rotation device 12 may comprise, as in the embodiment of FIG. 6, a screw coupling between a portion of the spindle 6 and the soft portion 7. This screw coupling may comprise, in particular, a limit switch (not shown). This screw coupling may comprise, in particular, a thread oriented in one direction (right or left) determined in relation to the rotation of the spindle 6 during the cutting operation, so that the interaction between the soft portion 7 and the cutting device causes a force contrary to unscrewing of the aforesaid screw coupling, so as to prevent an unscrewing rotation of the soft portion 7.

Figure 7:
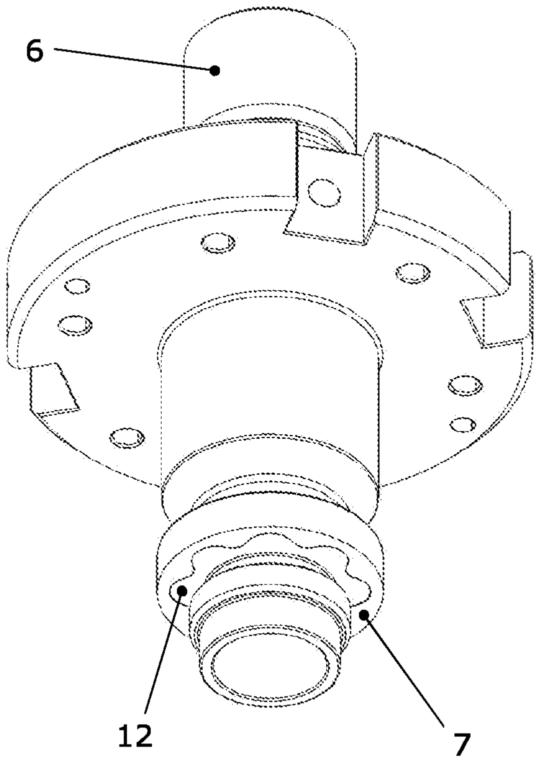

The anti-rotation device 12 may comprise, as in the embodiment of FIG. 7, a central portion of the spindle 6 coupled with a shape coupling with a central opening of the annular soft portion 7, in which the aforesaid shape coupling is made, as in this embodiment, from a crown arrangement of lobes arranged geometrically around the spindle axis Y, so as to form in particular a continuous sinuous circumferential path that is devoid of sharp corners.

Figure 8:
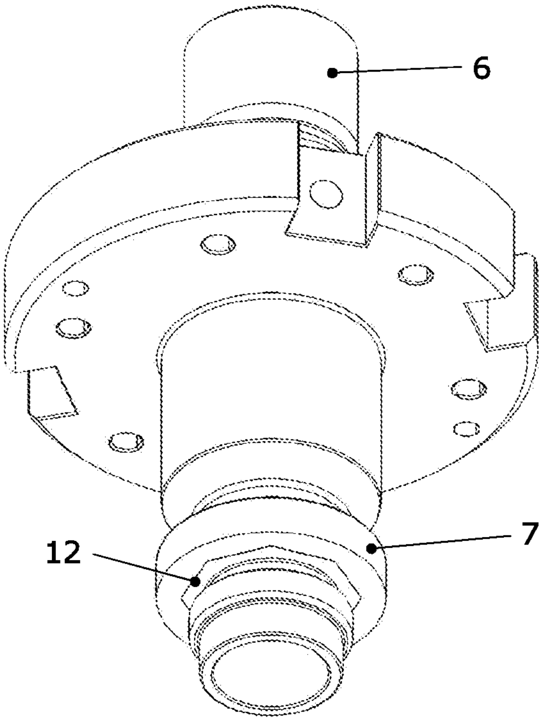

The anti-rotation device 12 may comprise, as in the embodiment of FIG. 8, a portion of the spindle 6 coupled with a shape coupling with a central opening of the annular soft portion 7, in which the aforesaid shape coupling is made of a peripheral outline of the portion of the spindle 6 of non-circular shape (for example polygonal, in particular octagonal as in FIG. 8) arranged geometrically around the spindle axis Y (or with a circular shape but eccentric or not coaxial with the spindle axis Y.

This peripheral outline is coupled with shape coupling with a corresponding inner edge of the central opening of the annular soft portion 7. The peripheral outline of non-circular shape may be, in particular, of elliptic shape, regular or non-regular polygon shape, star-shaped, or of other shapes that are suitable for preventing rotation of the soft portion 7 on itself with respect to the rest of the spindle 6 (in particular around the spindle axis Y).

The anti-rotation device 12, by preventing the rotation of the soft portion 7 with respect to the rest of the spindle 6, ensures that the zone of the softer portion of the spindle that is affected, and thus worn, by the vertical or oblique blade, is always the zone at each rotation of the carousel.

The cutting apparatus may be controlled by a control method that is suitable for reducing the risk of damage to the apparatus, in particular to the blades 4, 5 of the cutting device 3. This control method may comprise, in particular, a preliminary step, or step of initial startup, in which for a certain period of time the spindles run "on empty", i.e. with rotation of the carousel and with rotations of the spindles but without feeding of the closures 2.

This preliminary step takes each spindle 6 several times to the cutting device 3 without taking the closure 2 ("on empty") and during this feeding "on empty" each blade (i.e. the horizontal blade/s 4 and/or the vertical or oblique blade/s 5) is moved (forwards) so as to gradually increase the depth at which the blade sinks into the soft portion 7, in particular until a nominal work position is reached in which the blade sinks into the soft portion 7 to a desired depth, starting from an initial (retracted) position far from the nominal work position.

In practice, during this preliminary or initial startup step, the cutting device 3 is initially controlled so as to adopt a retracted configuration, i.e. in which the set of the blades (one or more horizontal blades 4 and at least one vertical or oblique blade 5) is arranged in a retracted configuration, where "retracted" must be understood with reference to the suitable nominal position to perform cutting of the closures 2. After which, all the blades are moved progressively forwards, in particular with controlled progression, in particular until the nominal cutting position is reached.

During this progressive advancement, whilst the carousel continues to rotate and also the spindles continue to rotate (without carrying the closures 2), the blades of the cutting device 3 sink a little at a time more and more into the softer portion 7 of the spindle 6, with a depth of penetration into the soft material of the spindles 6 that increases progressively, substantially at each revolution of the carousel for each spindle. The progression may be continuous or discontinuous or mixed (partially continuous or discontinuous).

This control method (progressive incision cycle of the soft portions 7 of the spindles 6) may be, in particular, controlled by an operator by a specific command on a user interface.

At the start of the progressive incision cycle, it is possible (with the carousel stationary) for the controller to retract automatically the blades unit (in nominal work position) by a certain distance (for example, purely by way of non-limiting example, by about 0.60 mm with respect to the normal work position of the blades). After which the controller automatically starts rotation of the carousel and of the spindles carried by the carousel, starting a first step of slight incision of the soft portions 7 of the various spindles 6. This first incision step may have a preset programmed duration (for example, of about 2 minutes).

Thereafter, it is possible to provide a second step of incision of the soft portions 7, that is slightly deeper than the preceding step, by advancing the blades by a preset quantity, for example by about 0.05 mm, so that the first advancement of the blades could be, for example, a passage from the position—0.60 mm to the position—0.55 mm, taking as a reference zero the actual or nominal work position that the blades have to adopt in the normal cutting situation of the closures 2.

This second incision step could comprise, in particular, an initial interruption step in which the rotation of the carousel is interrupted, and could thus comprise the intermediate step of controlled advancement of the blades, and a subsequent restarting step in which the controller automatically restarts the rotation of the carousel and of the spindles carried by the carousel, to actually start the step proper of incision of the soft portions 7. Also this incision step proper may have a preset programmed duration (for example, of about 2 minutes).

The aforesaid interruption, advancement cycle (for example by about 0.05 mm at each cycle) and restart may be repeated automatically until the actual nominal work position of the blades is reached, i.e. the blade position value equal to 0.00 mm, at which the blades will cut the closures 2.

The aforesaid values of the progressive advancement steps of 0.05 mm for each cycle and of the incision times of 2 minutes for each cycle are only example values and other values could be programmed (for example 0.01 mm, 0.02 mm, 0.03 mm, 0.04 mm, 0.06 mm, 0.07 mm, 0.08 mm, 0.09 mm, or 0.10 mm of progressive advancement for each cycle and 1 minute, 1.5 minutes, 2.5 minutes or 3 minutes of incision time for each cycle, in any possible combination of progressive advancement and incision times, also by programming progressive advancements and/or different incision times between one cycle (interruption, advancement, restart) and the other.

The invention claimed is:

1. A method for cutting closures, comprising the steps of:

feeding a spindle which carries a closure to a cutting device with one or more horizontal blades and at least one vertical or oblique blade, the spindle being fed several times to the cutting device carrying a different closure each time, the spindle comprising a soft portion made of a softer material than the blades;

rotating the spindle around a spindle axis to move the closure on the cutting device so that the at least one vertical or oblique blade penetrates into the closure and sinks into the soft portion of the spindle, the rotation of the spindle being coordinated with the feeding of the spindle so that the at least one vertical or oblique blade, every time the spindle is fed to the cutting device, always encounters a same vertical or oblique area of the soft portion, wherein in first feedings of the spindle to the cutting device, the at least one vertical or oblique blade gouges a vertical or oblique slit or groove in the soft portion and in subsequent feedings of the spindle to the cutting device, the at least one vertical or oblique blade always interacts with the previously gouged slit or groove without damaging the spindle further.

2. The method according to claim 1, a shape of the vertical or oblique area of said soft portion of the spindle corresponds to a shape of the at least one vertical or oblique blade.

3. The method according to claim 1, wherein the spindle is carried by a carousel rotatable around a carousel axis, and wherein a ratio of a number of revolutions in a unit of time of the carousel axis and the spindle axis is equal to 1:N, with N equal to an integer.

4. The method according to claim 1, wherein a carousel carries the spindle, the carousel being driven in rotation, the spindle being driven in rotation around a spindle axis independently of the rotation of the carousel.

5. The method according to claim 1, wherein a carousel carries the spindle and wherein a mechanical transmission connects a carousel axis with a spindle axis of the spindle.

6. The method according to claim 1, wherein a carousel carries the spindle, the rotation and feeding of the spindle being coordinated by a coordinated motion of a carousel axis and a spindle axis of the spindle controlled synchronously by an electronic controller.

7. The method according to claim 1, wherein a carousel carries the spindle and wherein the spindle is rotated independently of the carousel.

* * * * *